(12) United States Patent
De et al.

(10) Patent No.: US 8,688,447 B1
(45) Date of Patent: Apr. 1, 2014

(54) METHOD AND SYSTEM FOR DOMAIN-SPECIFIC NOISY CHANNEL NATURAL LANGUAGE PROCESSING (NLP)

(71) Applicant: Ask Ziggy, Inc., Rocklin, CA (US)

(72) Inventors: Nirmalya Kumar De, Roseville, CA (US); Kyle Wade Grove, Roseville, PA (US)

(73) Assignee: Ask Ziggy, Inc., Rocklin, CA (US)

( * ) Notice: Subject to any disclaimer, the term of this patent is extended or adjusted under 35 U.S.C. 154(b) by 0 days.

(21) Appl. No.: 13/972,300

(22) Filed: Aug. 21, 2013

(51) Int. Cl.
*G10L 15/26* (2006.01)

(52) U.S. Cl.
USPC .......................... 704/235; 704/231; 704/257

(58) Field of Classification Search
USPC ......... 704/231, 233, 235, 255, 251, 257, 270, 704/270.1
See application file for complete search history.

(56) References Cited

U.S. PATENT DOCUMENTS

| | | | | |
|---|---|---|---|---|
| 5,754,978 | A * | 5/1998 | Perez-Mendez et al. | 704/255 |
| 5,832,063 | A * | 11/1998 | Vysotsky et al. | 379/88.03 |
| 6,122,613 | A * | 9/2000 | Baker | 704/235 |
| 6,182,029 | B1 | 1/2001 | Friedman | |
| 6,466,654 | B1 | 10/2002 | Cooper et al. | |
| 6,539,359 | B1 | 3/2003 | Ladd et al. | |
| 7,016,835 | B2 * | 3/2006 | Eide et al. | 704/231 |
| 7,266,496 | B2 | 9/2007 | Wang et al. | |
| 7,502,765 | B2 | 3/2009 | Kummamuru et al. | |
| 7,707,032 | B2 | 4/2010 | Wang et al. | |
| 2008/0221903 | A1 | 9/2008 | Kanevsky et al. | |
| 2011/0153322 | A1 | 6/2011 | Kwak et al. | |

OTHER PUBLICATIONS

Harbusch, K., Woch, J., "Integrated Natural Language Generation with Schema-Tree Adjoining Grammars," University of Koblenz-Landau, Computer Science Department, 2002 (31 pages).

Turian, J. et al., "Word Representations: A Simple and General Method for Semi-Supervised Learning," In Proceedings of the 48th Annual Meeting of the Association for Computational Linguistics (Jul. 2010), pp. 384-394 Key: citeulike: 9336123.

Cutting, D., et al., "A Practical Part-of-Speech Tagger. Proceedings of the Third Conference on Applied Natural Language Processing," 1992 pp. 133-140.

Rabiner, L., "A Tutorial on Hidden Markov Models and Selected Applications in Speech Recognition," Proceedings of the IEEE, vol. 77, No. 2 Feb. 1989 pp. 257-286.

Merialdo, B., "Tagging English Text with a Probabilistic Model," Association for Computational Linguistics 20(2). 1994 pp. 155-171.

(Continued)

*Primary Examiner* — Huyen X. Vo
(74) *Attorney, Agent, or Firm* — Osha Liang LLP

(57) ABSTRACT

A method for processing transcriptions using natural language processing (NLP), the method includes obtaining transcriptions corresponding to an utterance from a user device, where each of the transcriptions is a different speech-to-text conversion of the utterance. The method further includes tagging a first transcription with at least one entity tag and a first transcription-level tag to obtain a first tagged transcription, tagging the second transcription with at least one entity tag and a second transcription-level tag to obtain a second tagged transcription, determining a highest probability transcription-level tag from the first transcription-level tag and second transcription-level tag. The method further includes identifying a subject-matter domain using the highest probability transcription-level tag, retagging the first transcription and the second transcription using entity tags associated with the subject-matter domain to obtain retagged transcriptions, performing, using the retagged transcriptions, an action to obtain a result, and sending the result to the user device.

20 Claims, 12 Drawing Sheets

(56) References Cited

OTHER PUBLICATIONS

Uschold, M. et al., "Ontologies: Principles, Methods and Applications," To appear in Knowledge Engineering Review vol. 11 No. 2, Jun. 1996, (69 pages).

Berger, A. et al., "A Maximum Entropy Approach to Natural Language Processing," Computational Linguistics 22(1). 1996 pp. 39-71.

Marques, L., "Semantic Role Labeling as Sequential Tagging," CONLL '05 Proceeding of the Ninth Conference on Computational Natural Language Learning. 2005 pp. 193-196.

Meurer, P., "INESS-Search: A Search System for LFG (and other) Treebanks," Proceeding of the LFG12 Conference, Jun. 28, 2012 (18 pages).

\* cited by examiner

METHOD AND SYSTEM FOR DOMAIN-SPECIFIC NOISY CHANNEL NATURAL LANGUAGE PROCESSING (NLP)

BACKGROUND

Usually, the conversion of an audio file to text results in a conversion containing several noisy words that do not contribute to the meaning of the transcription as a whole. Often, developers using speech-to-text conversions to perform actions have difficulty deriving meaning on a transcription-level basis due to substantial inaccuracy associated with speech-to-text conversions.

SUMMARY

In general, in one aspect, the invention relates to a method for processing transcriptions using natural language processing (NLP), the method including: obtaining a transcriptions corresponding to an utterance, where each of the transcriptions is a different speech-to-text conversion of the utterance, where the transcriptions include a first transcription and a second transcription, and where the utterance was obtained by a user device, tagging the first transcription with at least one entity tag to obtain a first tagged transcription, tagging the first transcription with a first transcription-level tag using the at least one entity tag associated with the first tagged transcription, tagging the second transcription with at least one entity tag to obtain a second tagged transcription, tagging the second transcription with a second transcription-level tag using the at least one entity tag associated with the second tagged transcription, determining a highest probability transcription-level tag, where the highest probability transcription-level tag is one selected from a group consisting of the first transcription-level tag and the second transcription-level tag, identifying a subject-matter domain using the highest probability transcription-level tag, retagging the first transcription and the second transcription using entity tags associated with the subject-matter domain to obtain a retagged first transcription and a retagged second transcription, performing, using the retagged first transcription and the retagged second transcription, an action to obtain result, and sending the result to the user device.

In general, in one aspect, the invention relates to a Natural Language Processing (NLP) system, the system including: a processor, a memory including instructions, which when executed by a processor perform a method, the method including: obtaining a transcriptions corresponding to an utterance, where each of the transcriptions is a different speech-to-text conversion of the utterance, where the transcriptions include a first transcription and a second transcription, and where the utterance was obtained by a user device, tagging the first transcription with at least one entity tag to obtain a first tagged transcription, tagging the first transcription with a first transcription-level tag using the at least one entity tag associated with the first tagged transcription, tagging the second transcription with at least one entity tag to obtain a second tagged transcription, tagging the second transcription with a second transcription-level tag using the at least one entity tag associated with the second tagged transcription, determining a highest probability transcription-level tag, where the highest probability transcription-level tag is one selected from a group consisting of the first transcription-level tag and the second transcription-level tag, identifying a subject-matter domain using the highest probability transcription-level tag, retagging the first transcription and the second transcription using entity tags associated with the subject-matter domain to obtain a retagged first transcription and a retagged second transcription, performing, using the retagged first transcription and the retagged second transcription, an action to obtain result, and sending the result to the user device.

In general, in one aspect, the invention relates to a non-transitory computer readable medium including instructions, which when executed perform a method for processing transcriptions using natural language processing (NLP), the method includes: obtaining transcriptions corresponding to an utterance, wherein each of the transcriptions is a different speech-to-text conversion of the utterance, where the transcriptions include a first transcription and a second transcription, and where the utterance was obtained by a user device, tagging the first transcription with at least one entity tag to obtain a first tagged transcription, tagging the first transcription with a first transcription-level tag using the at least one entity tag associated with the first tagged transcription, tagging the second transcription with at least one entity tag to obtain a second tagged transcription, tagging the second transcription with a second transcription-level tag using the at least one entity tag associated with the second tagged transcription, determining a highest probability transcription-level tag, where the highest probability transcription-level tag is one selected from a group consisting of the first transcription-level tag and the second transcription-level tag, identifying a subject-matter domain using the highest probability transcription-level tag, retagging the first transcription and the second transcription using entity tags associated with the subject-matter domain to obtain a retagged first transcription and a retagged second transcription, performing, using the retagged first transcription and the retagged second transcription, an action to obtain result, and sending the result to the user device.

Other aspects of the invention will be apparent from the following description and the appended claims.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-6G, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to a natural language processing (NLP) system that extracts relevant information from speech-to-text converted transcriptions and uses it to perform actions. Further, embodiments of the invention obtain any missing information necessary to perform the action through dialogue with the user device.

Figure 1:
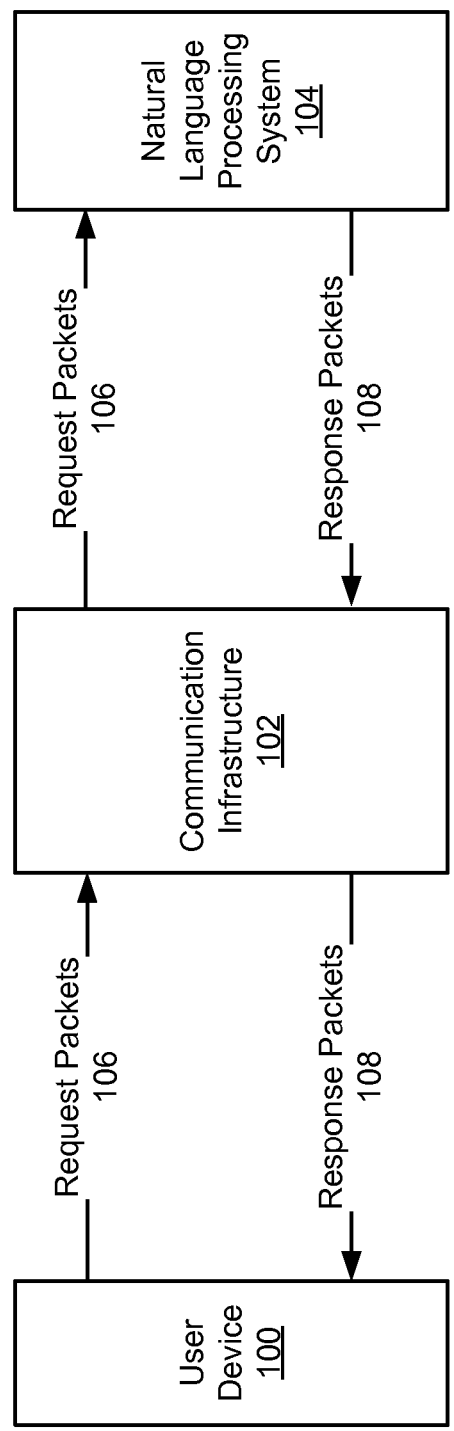
FIG. 1 shows a system in accordance with one or more embodiments of the invention.

FIG. 1 shows a system in accordance with one or more embodiments of the invention. The system includes one or more user devices (100) configured to send request packets (106) to the natural language processing (NLP) system (104) via a communication infrastructure (102). The NLP system (104) is configured to receive request packets, process the request packets to generate response packets (108), and to send the response packets (108) to the user device (100).

In one embodiment of the invention, the user device (100) corresponds to any physical device that includes functionality to transmit request packets to the NLP system (104) and receive response packets (110) from the NLP system. The user device (100) may further include functionality to execute one or more applications (not shown). The applications may be user-level applications and/or kernel-level applications. The applications are configured to generate request packets, where request packets issued by the applications are received and processed by the NLP system (104). The applications may further be configured to receive and process the response packets. In some embodiments of the invention, the request packets may be generated by dedicated hardware and/or the response packets may be processed by dedicated hardware (as discussed below).

In one embodiment of the invention, the physical device may be implemented on a general purpose computing device (i.e., a device with a processor(s), memory, and an operating system) such as, but not limited to, a desktop computer, a laptop computer, a gaming console, and a mobile device (e.g., a mobile phone, a smart phone, a personal digital assistant, a gaming device, a wearable computing device, etc.).

Alternatively, the physical device may be a special purpose computing device that includes an application-specific processor(s)/hardware configured to only execute embodiments of the invention. In such cases, the physical device may implement embodiments of the invention in hardware as a family of circuits and have limited functionality to receive input and generate output in accordance with various embodiments of the invention. In addition, such computing devices may use a state-machine to implement various embodiments of the invention.

In another embodiment of the invention, the physical device may correspond to a computing device that includes a general purpose processor(s) and an application-specific processor(s)/hardware. In such cases, one or more portions of the invention may be implemented using the operating system and general purpose processor(s), and one or more portions of the invention may be implemented using the application-specific processor(s)/hardware.

In one embodiment of the invention, the communication infrastructure (102) corresponds to any wired network, wireless network, or combined wired and wireless network over which the user device (100) and the NLP system (104) communicate. In one embodiment of the invention, the user device (100) and NLP system (104) may communicate using any known communication protocols.

Figure 3:
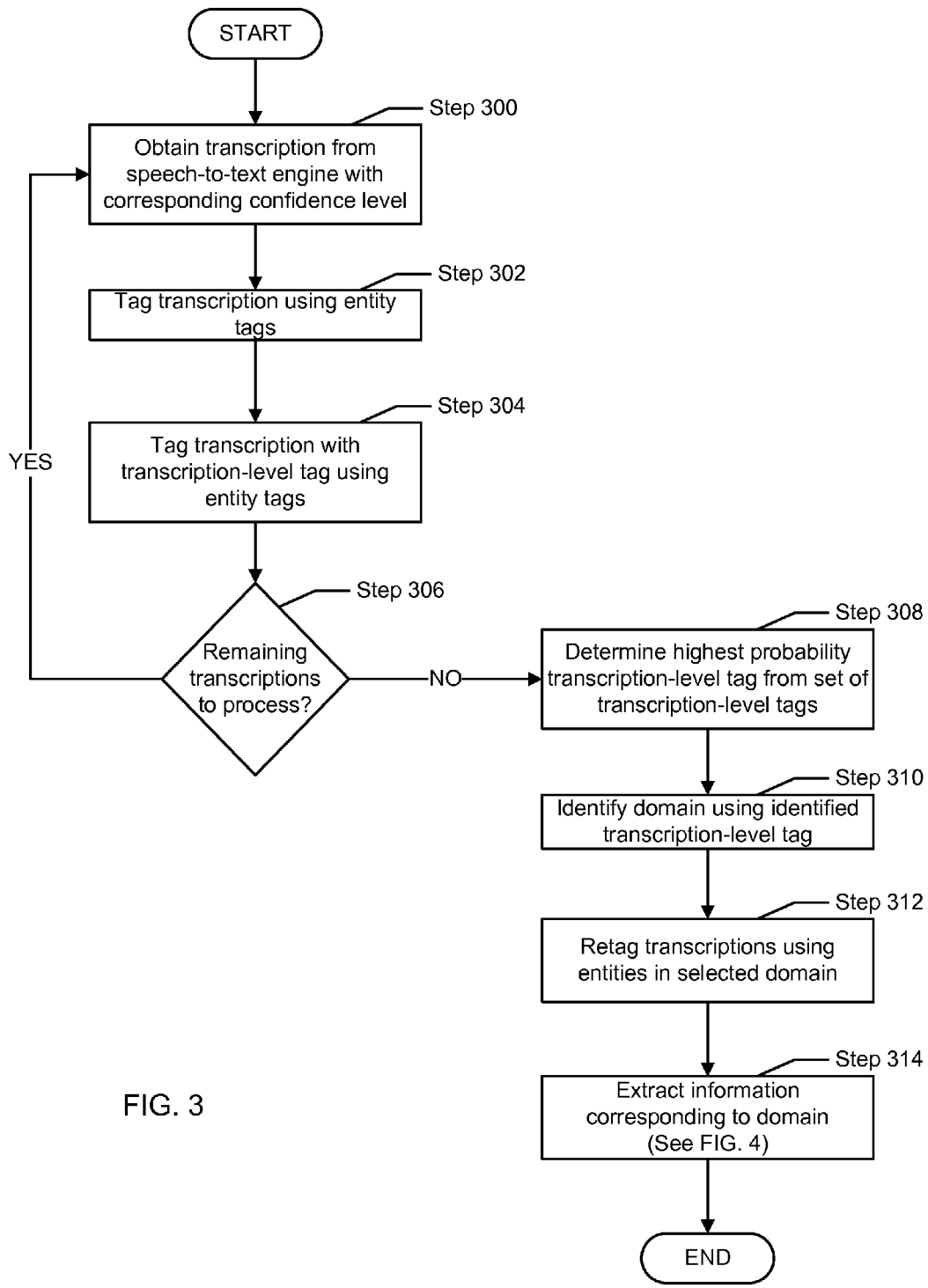
FIG. 3 shows a flowchart for tagging transcriptions in accordance with one or more embodiments of the invention.
Figure 4:
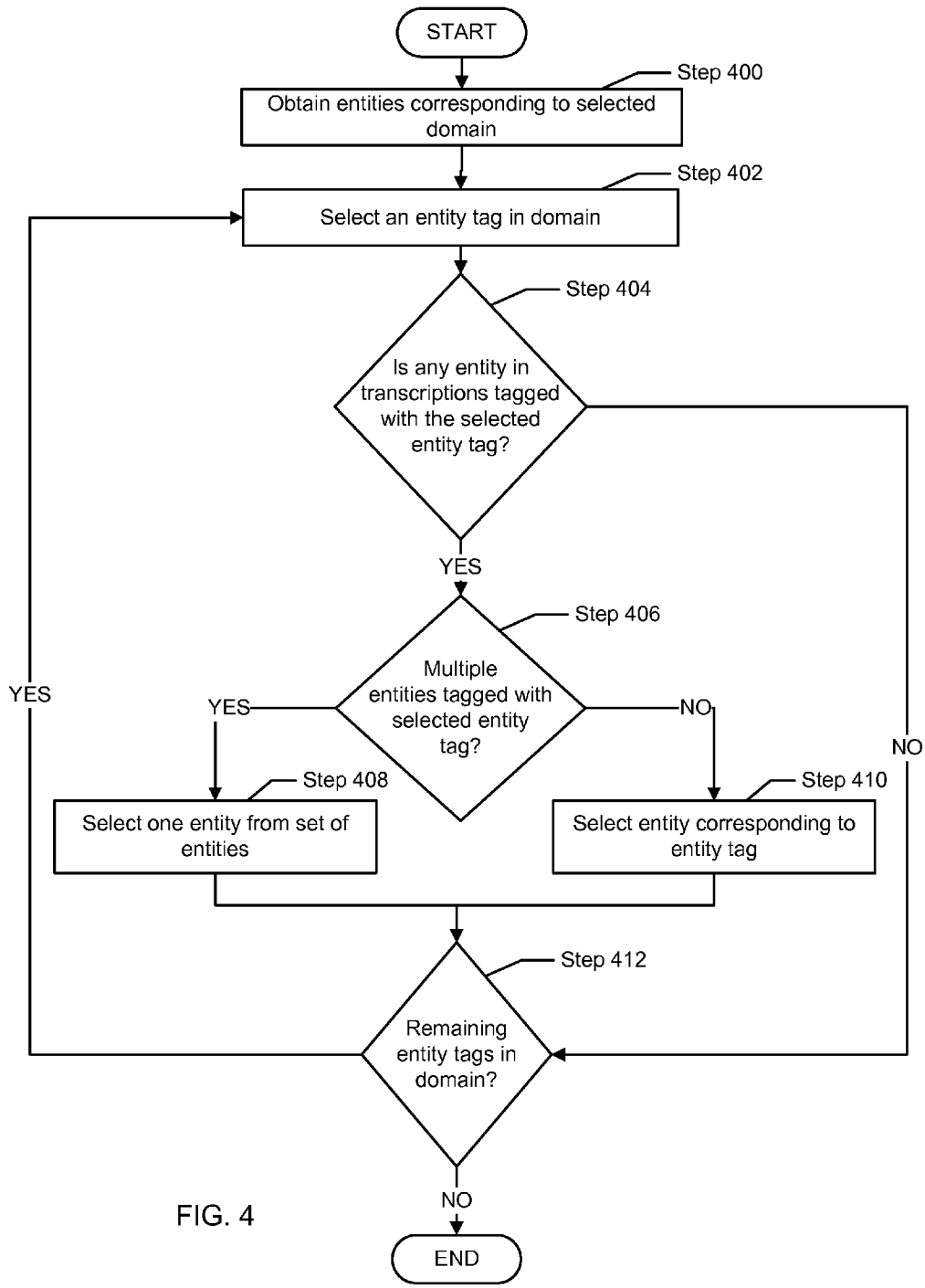
FIG. 4 shows a flowchart for obtaining entities corresponding to a domain accordance with one or more embodiments of the invention.
Figure 5:
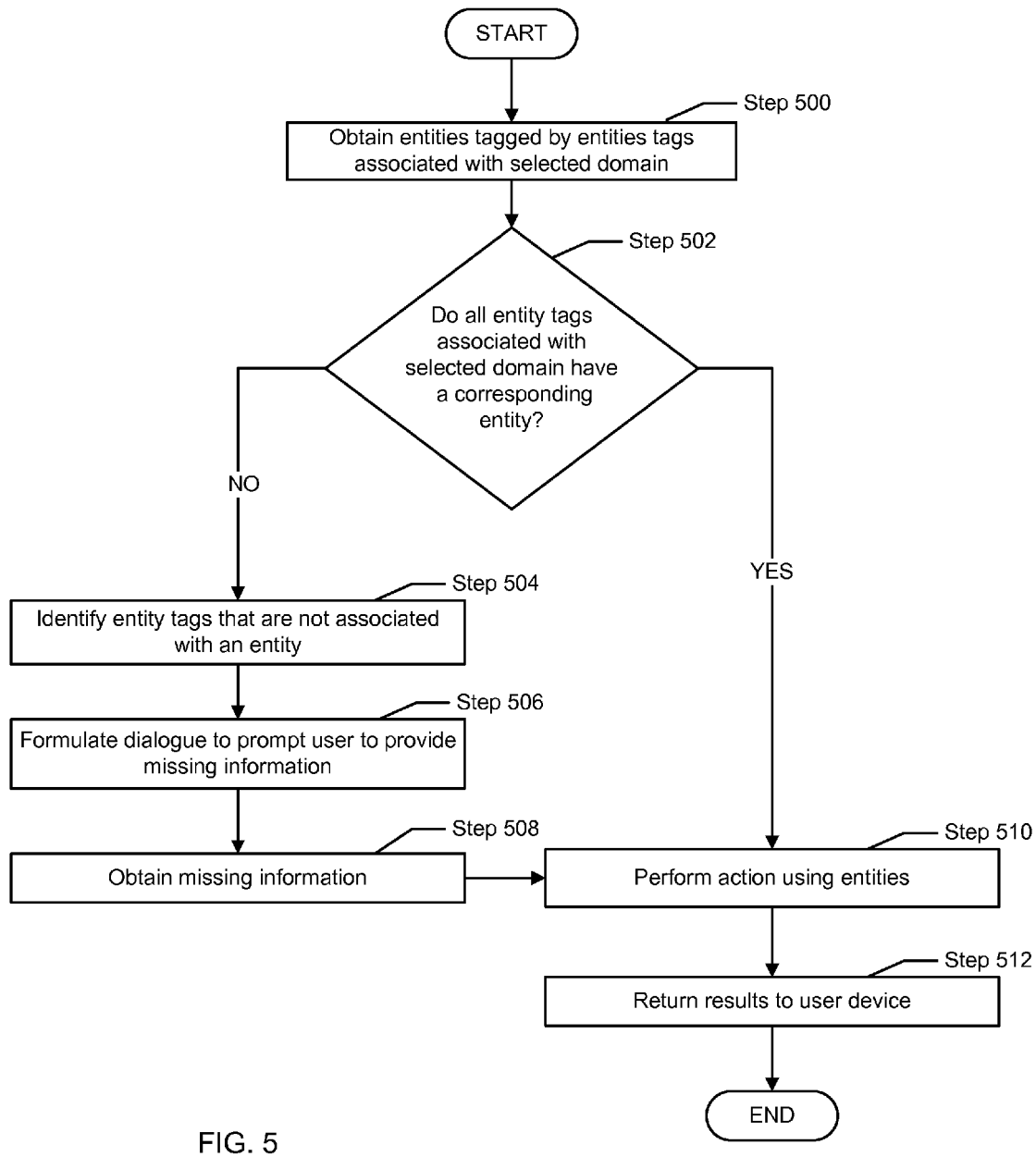
FIG. 5 shows a flowchart for obtaining additional entities corresponding to a domain and performing actions of the entities in accordance with one or more embodiments of the invention.

In one embodiment of the invention, the NLP system (104) corresponds to any physical device(s) configured to process the request packets in accordance with the methods shown in FIGS. 3-5.

In one embodiment of the invention, the request packets may include digital audio data. In one embodiment of the invention, request packets are generated by encoding an audio signal into a digital form and then converting the resulting digital audio data into one or more request packets. The conversion of the digital audio data into one or more request packets may include applying an audio codec to the digital audio data to compress the digital audio data prior to generating the request packets. The use of the audio codec may enable a smaller number of request packets to be sent to the NLP system.

In one embodiment of the invention, the audio signal may be obtained from a user speaking into a microphone on the user device. Alternatively, the audio signal may correspond to a pre-recorded audio signal that the user provided to the user device using conventional methods. In other embodiments of the invention, the user device may receive the digital audio data directly instead of receiving an analog audio signal. In other embodiments of the invention, the audio signal may be computer-generated.

In one embodiment of the invention, the audio signal includes one or more audio utterances. An audio utterance corresponds to a unit of speech bounded by silence. The utterance may be a word, a clause, a sentence, or multiple sentences. An utterance may be converted into one or more textual transcriptions.

While FIG. 1 shows a system that includes a single user device, communication infrastructure, and NLP system, embodiments of the invention may include multiple user devices, communication infrastructures, and NLP systems without departing from the invention. Further, the invention is not limited to the system configuration shown in FIG. 1.

FIGS. 2A-2D show relationships between various elements in accordance with one or more embodiments of the invention.

In one embodiment of the invention, the transcriptions (204) that correspond to an utterance are tagged with at least one entity tag (202) and transcription-level tag (206) associated with a domain (212). The NLP system is configured to associate entity tags with one or more words in the transcription and a transcription-level tag with one transcription.

Figure 2A:
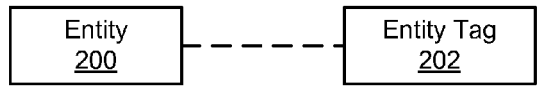
FIGS. 2A-2D show relationships between various elements in accordance with one or more embodiments of the invention.

As shown in FIG. 2A, an entity tag (also referred to as a semantic tag) (202) is used to classify an entity (200) within a domain. Said another way, the semantic tag (202) associated with an entity (200) provides information for what the entity means in relation to the domain. If the domain is hotel search, then the entity tags may be HOTEL-NAME, CITY, and NOISE, where an entity tagged with HOTEL-NAME indicates that the entity is a hotel name, where an entity tagged with CITY indicates that the entity is a city, and where an entity tagged with NOISE indicates that the entity is noise.

The semantic tags are contrasted with part-of-speech tagging, in which the tags each identify a particular part of speech, e.g., noun, verb, etc.

Figure 2B:
Figure 2B:
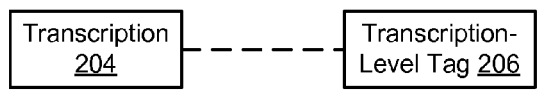
Figure 2B:
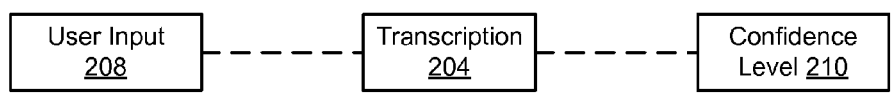

As shown in FIG. 2B, a transcription (204) is text resulting from speech-to-text conversion of an utterance (208), which is input by the user, and is associated with a confidence level (210), at least one entity tag (202), and at least one transcription-level tag (206). The confidence level (210) supplied by a speech-to-text engine for a given transcription is the probability that the conversion is accurate. Moreover, the entities (200) in the transcription may be tagged by one or more entity tags (202). Further, the transcription-level tags (206) provide information on how the tagged entities relate to each other as a whole. For a given utterance, one or more speech-to-text-converted transcriptions may be obtained.

Following the earlier example, if the domain is hotel search, the transcription-level tags may be BOOK-HOTEL, CNCL-HOTEL, and CHNG-HOTEL, where a transcription tagged with BOOK-HOTEL indicates that the transcription has entities related to booking a hotel, where a transcription tagged with CNCL-HOTEL indicates that the transcription has entities related to canceling a hotel booking, and where a transcription tagged with CHNG-HOTEL indicates that the transcription has entities related to changing a hotel booking.

Figure 2C:
Figure 2C:
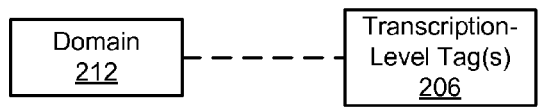

As shown in FIG. 2C, a domain (212) is associated with at least one entity tag (202) and at least one transcription-level tag (206). The domain (212) is a collection of entity tags and transcription-level tags that are related to each other. Following the example above, the domain of hotel search may include related entity tags such as HOTEL, CITY, and DATE, as well as transcription-level tags such as BOOK-HOTEL, CNCL-HOTEL, and CHNGE-HOTEL. A domain of travel search, for example, may include groups of entities and groups of transcription-level tags related to searching for hotels, flights, rental cars, and public transportation.

Figure 2D:
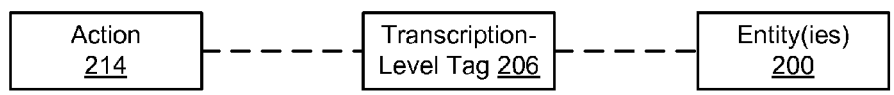

As shown in FIG. 2D, in one embodiment of the invention, each action (214) is associated with one or more transcription-level tags (206). Actions may be performed using entities (200) that are related to transcription-level tags. Following the above example, the transcription-level tag BOOK-HOTEL may be associated with actions such as booking a reservation with a hotel using entities tagged by HOTEL-NAME and CITY.

FIGS. 3-5 show flowcharts in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel. In one embodiment of the invention, the steps shown in any of the flowcharts may be performed in parallel with the steps shown in any of the other flowcharts.

Referring to FIG. 3, a flowchart for tagging transcriptions in accordance with one or more embodiments of the invention is shown. In Step 300, a transcription and its corresponding confidence level are obtained from a speech-to-text engine (see e.g., FIG. 6B). The transcriptions may be from the same or different speech-to-text engines. The speech-to-text engines may be third-party services.

In one or more embodiments of the invention, the user device may also specify a universe of specified domains. The universe is a collection of domains and determines the pool of entity tags and transcription-level tags that can be used to tag a transcription and entities within the transcription.

In one embodiment of the invention, the NLP system may assume that the universe includes all domains within the system. For example, the application may perform actions that are not restricted to a subset of domains. This may include applications that act as a personal assistant to the user by performing actions on utterances as varied as "Call Mom." and "Where is the nearest gas station?"

In another embodiment of the invention, the NLP system may determine the universe of domains based on the particular application sending the utterance. For example, if the application is strictly related to making restaurant reservations, then the NLP system may restrict the universe to domains involving restaurants.

In one embodiment of the invention, the user may specify that the provided speech-to-text transcriptions are related to travel and that the universe is set to include domains such as hotel search, air travel, and transportation.

Figure 6A:
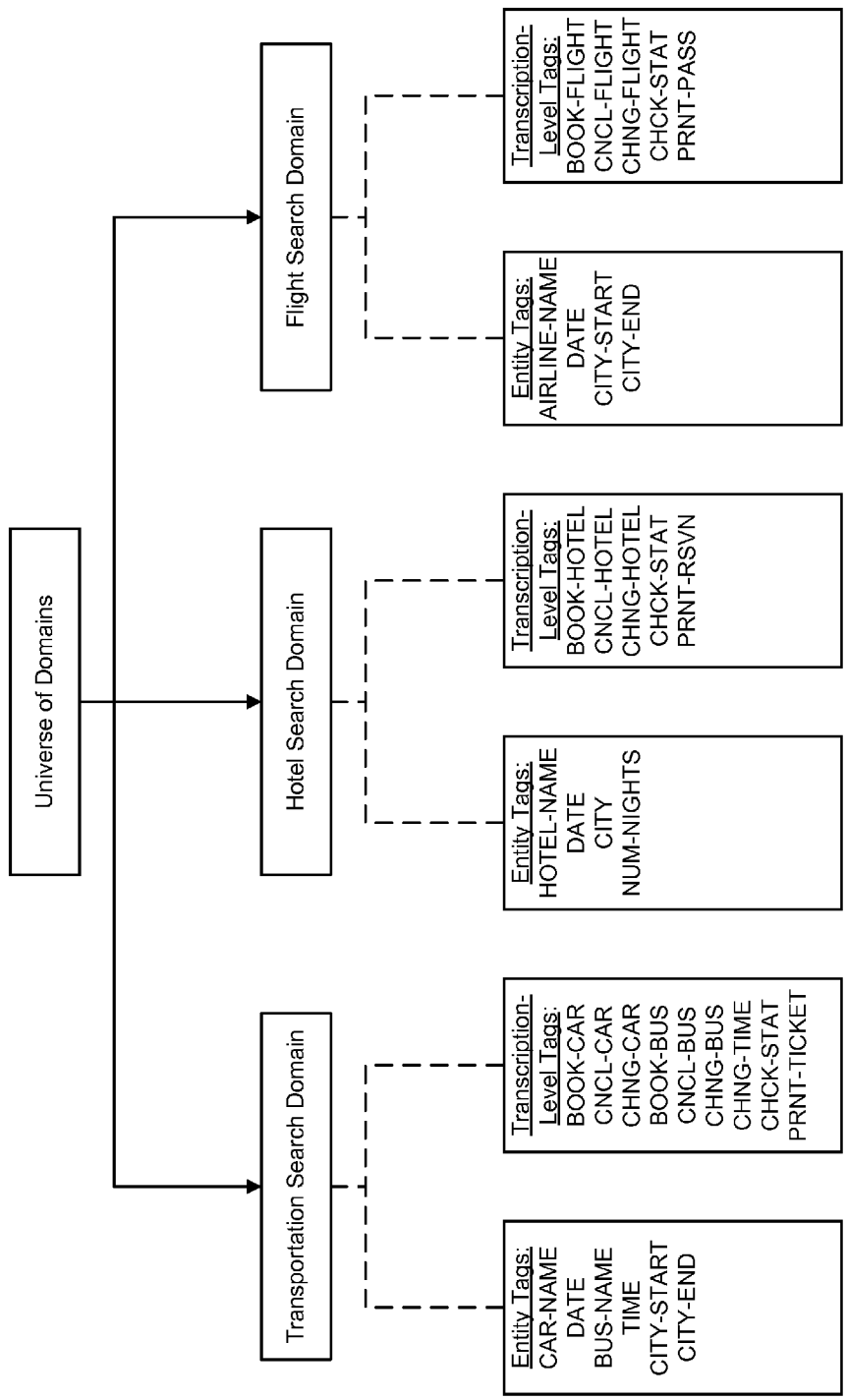
FIGS. 6A-6G show an example in accordance with one or more embodiments of the invention.
Figure 6B:
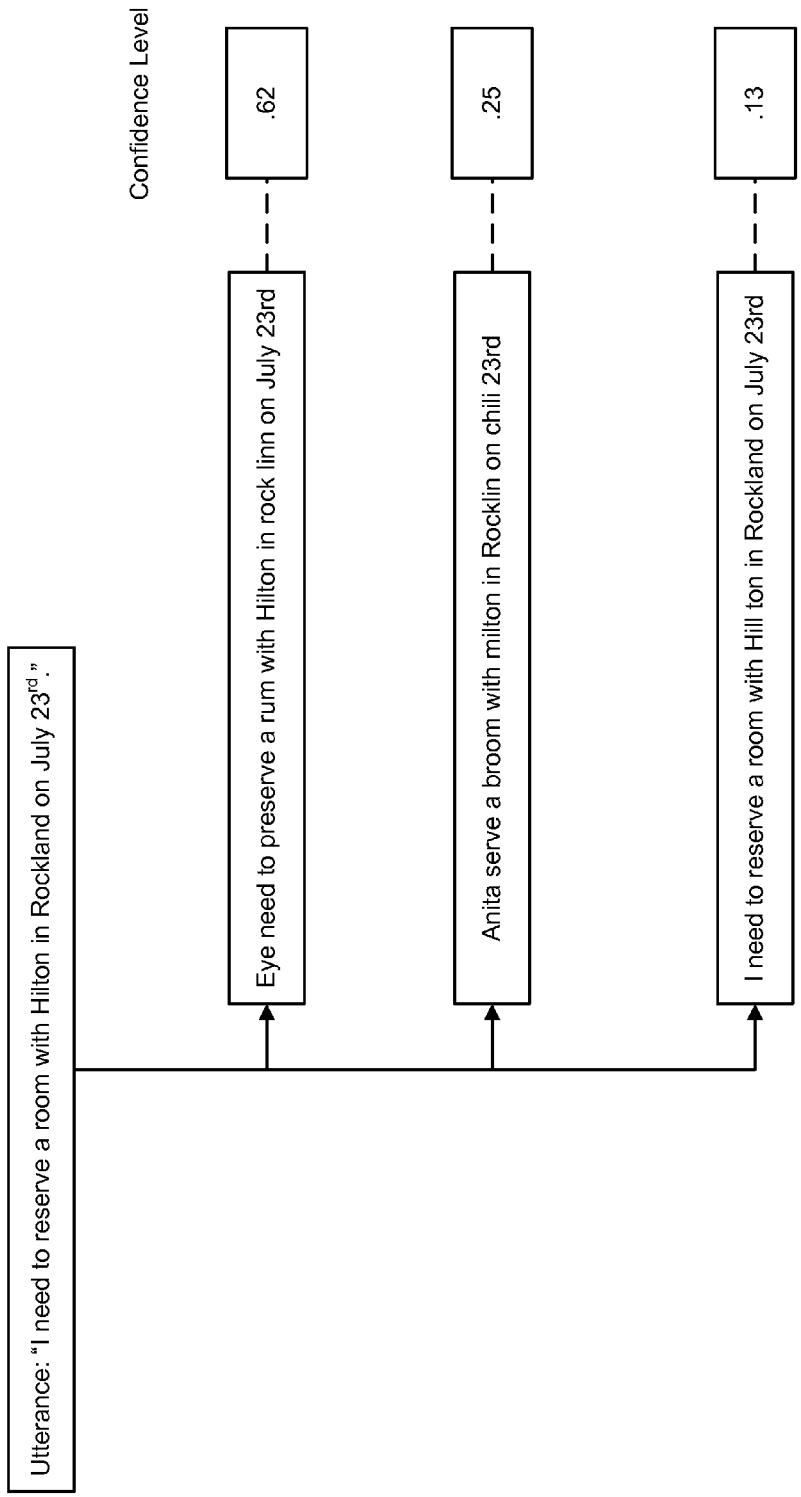
Figure 6C:
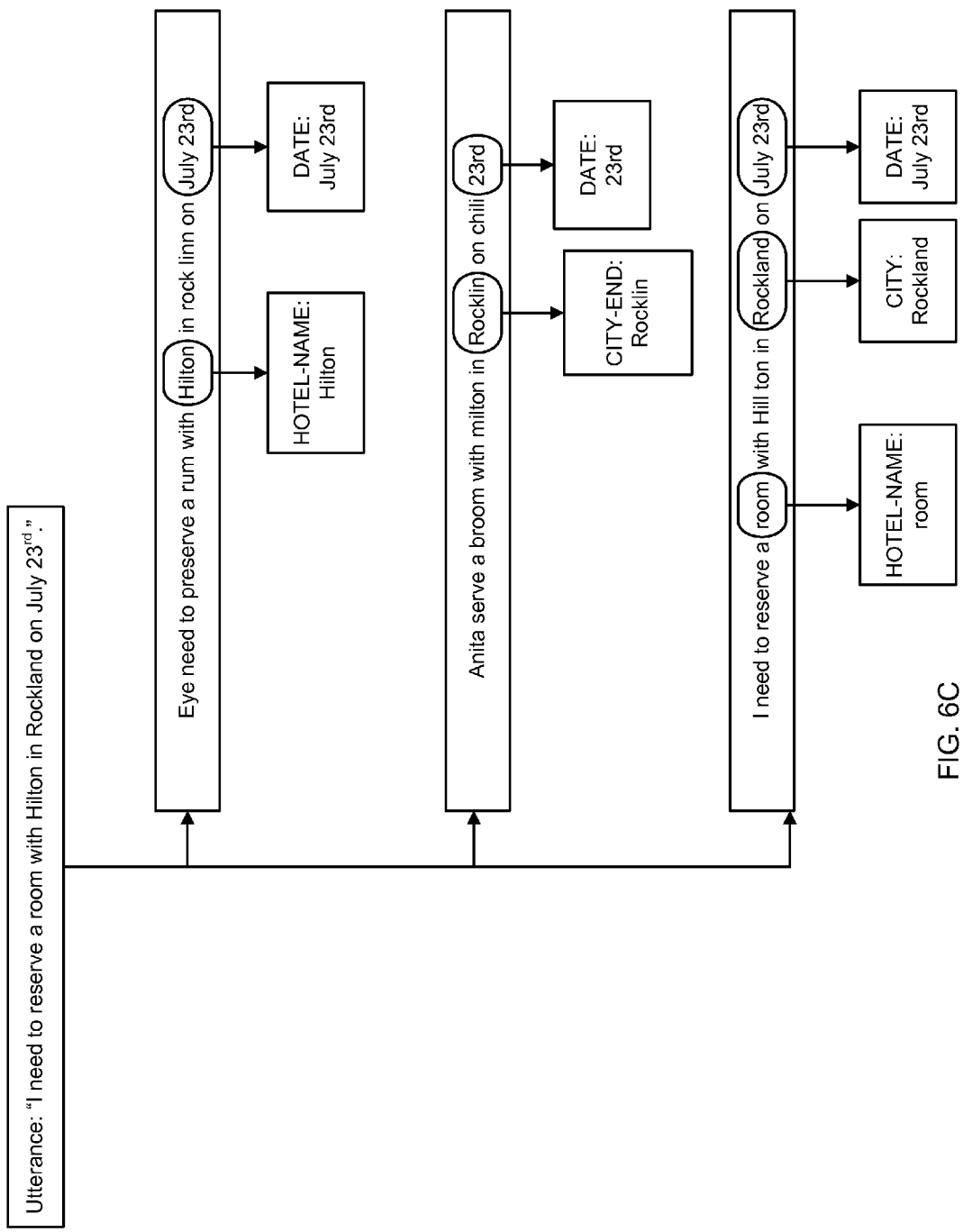

In Step 302, the transcription is tagged with the entity tags associated with the domains in the universe (see e.g., FIG. 6C). For example, words in the transcription such as "Hilton," "Hyatt," and "Marriott," may be tagged with the entity tag HOTEL-NAME under the domain hotel search.

In Step 304, the transcription is tagged with a transcription-level tag based, at least in part, on entities tagged by entity tags. In one or more embodiments of the invention, NLP is used to determine the transcription-level tag.

In one embodiment of the invention, the NLP system may tag each transcription with only one transcription-level tag. The system may use a maximum entropy Markov model to determine the transcription-level tag associated with each transcription. For example, the entities tagged in the transcription may include HOTEL-NAME and CITY. The NLP system may tag the transcription with the transcription-level tags of BOOK-HOTEL and BOOK-FLIGHT. Using the maximum entropy Markov model, the NLP system may determine that the highest probability transcription-level tag is BOOK-HOTEL and the transcription is then tagged with BOOK-HOTEL.

Figure 6D:
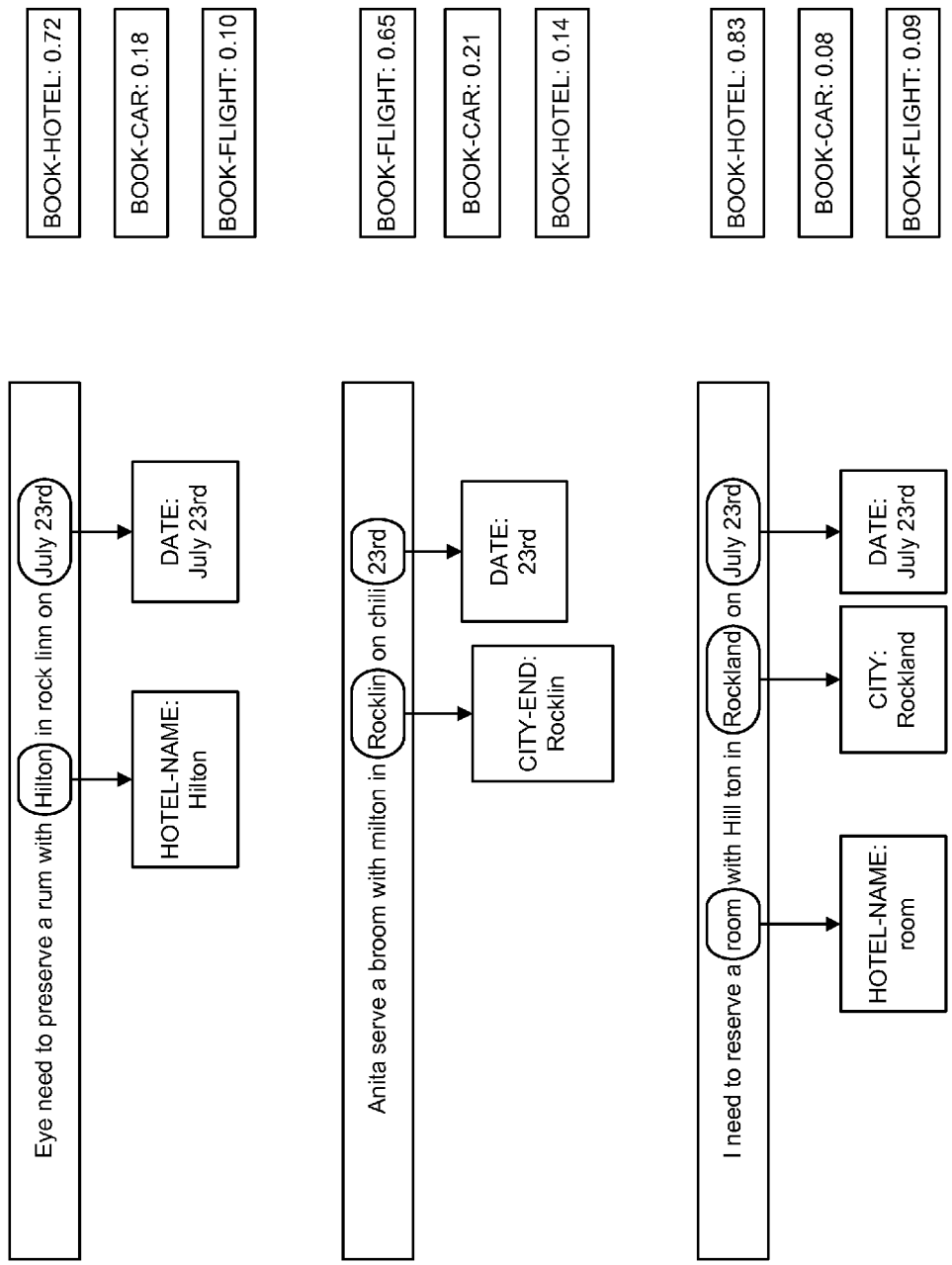

In another embodiment of the invention, the NLP system may tag each transcription with more than one transcription-level tag (see e.g., FIG. 6D). Each transcription-level tag, in this embodiment, has a corresponding probability of the transcription-level tag being associated with the transcription given the entities tagged by entity tags.

In Step 306, a determination is made whether there are more transcriptions to be processed. If additional transcriptions need to be processed, the process proceeds to Step 300. Otherwise, the process proceeds to Step 308.

In Step 308, the highest probability transcription-level tag across all transcriptions is determined from the set of transcription-level tags (see e.g., FIG. 6D). In other words, the transcription-level tag for the utterance as a whole is determined using the transcription-level tag of each transcription.

Figure 6E:
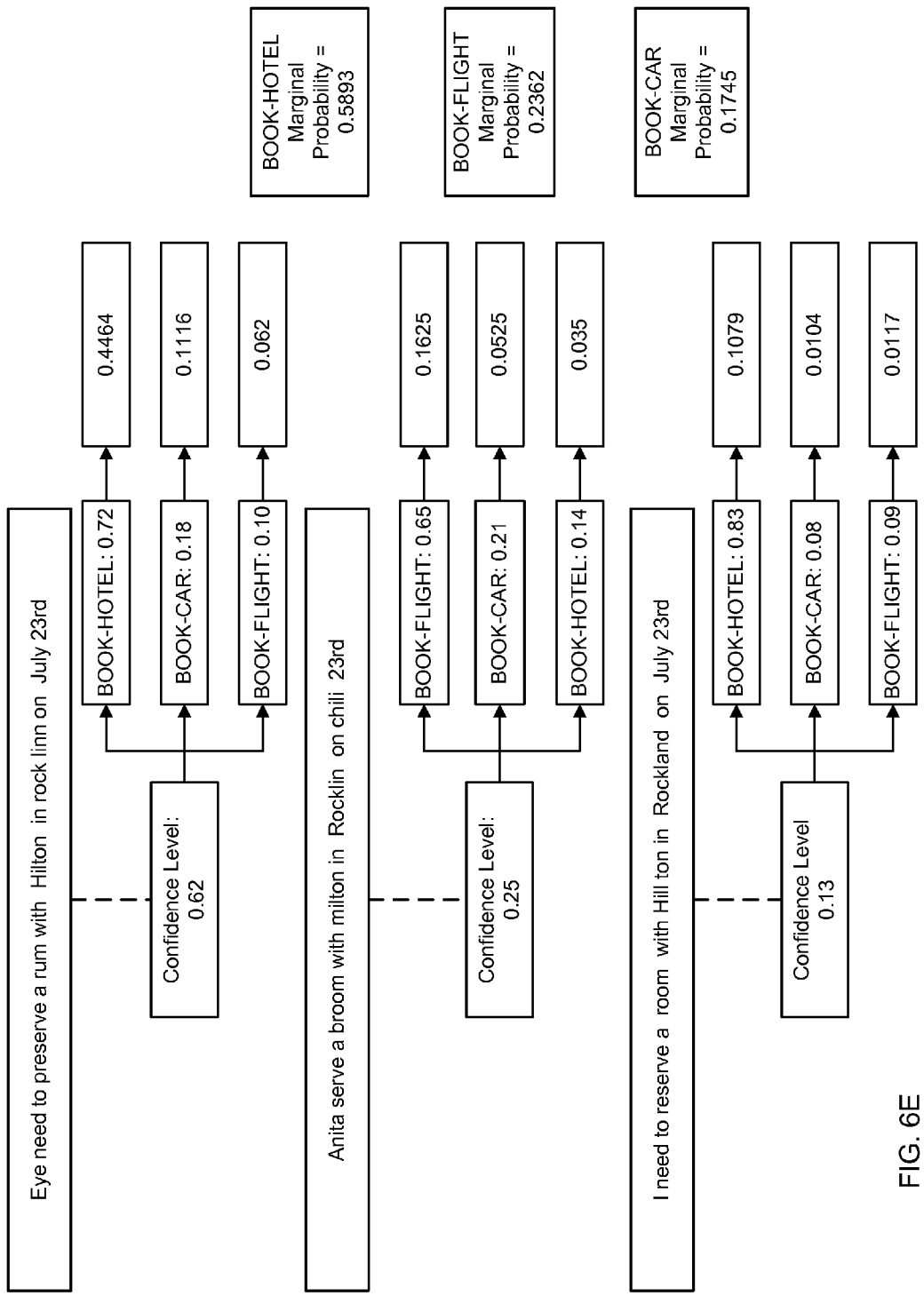

In one or more embodiments of the invention, there may be multiple different transcription-level tags across all the transcriptions that are in different domains (see e.g. FIG. 6E). In this scenario, the marginal probability may be used to determine the highest probability transcription-level tag. The marginal probability may be calculated by using the confidence level associated with the transcription and a probability of the transcription-level tag being associated with the transcription.

Figure 6F:
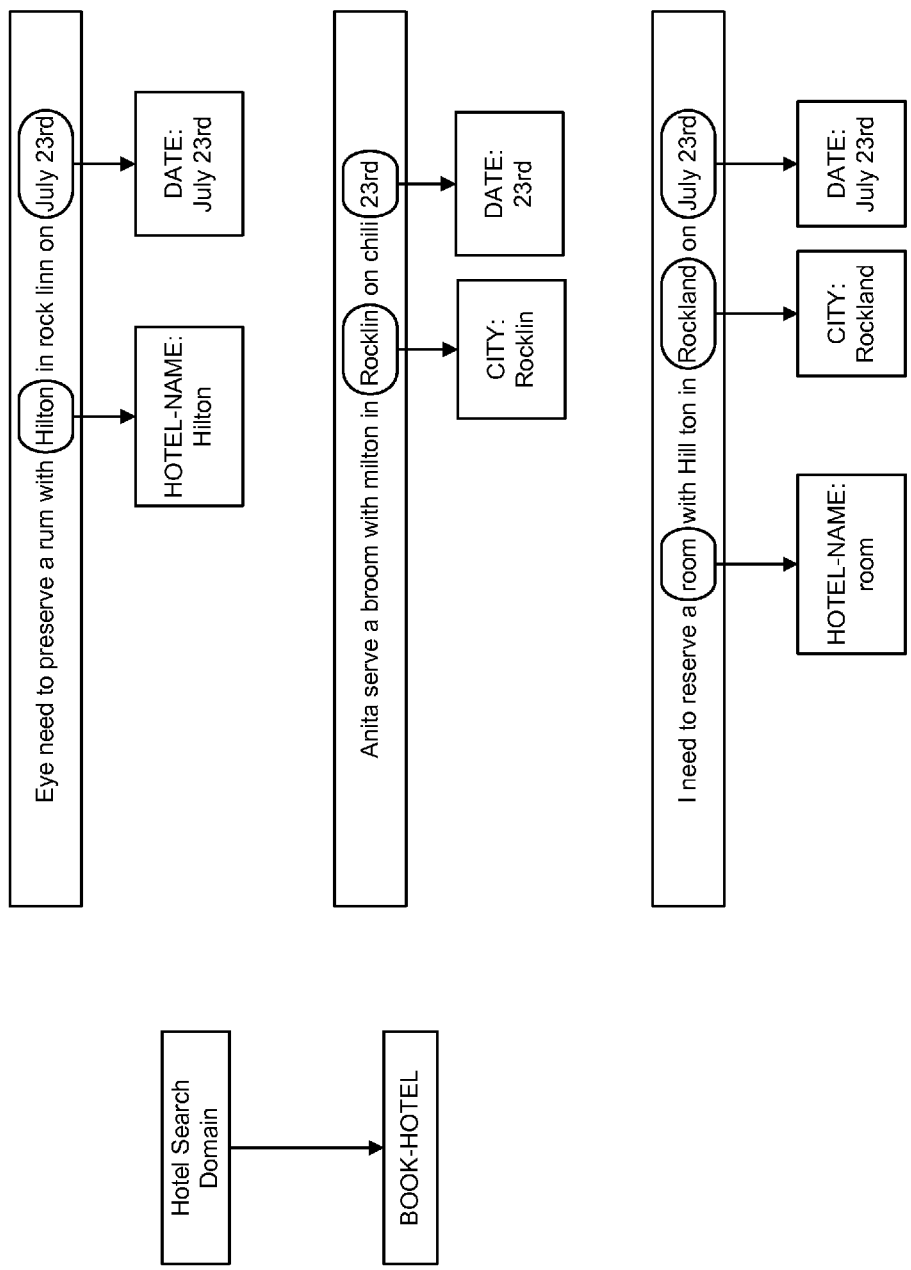

In Step 310, the domain of the utterance is identified using the transcription-level tag for the utterance (see e.g., FIG. 6F). As shown in FIG. 2C, the domain comprises groups of entity tags and transcription-level tags. Once the transcription-level tag has been determined for the utterance, the domain may be determined through the data structure relationship between the two. For example, once the transcription-level tag is determined to be BOOK-HOTEL, the domain may be identified as hotel search.

In Step 312, the transcriptions are then retagged using the entity tags associated with the selected domain (see e.g. FIG. 6F). Following the example above, the transcriptions would be retagged with all the entities associated with the hotel search domain. In Step 314, information corresponding to the entities associated with a domain is extracted (see e.g., FIG. 4 and FIG. 6G).

Referring to FIG. 4, a flowchart for obtaining entities corresponding to a domain in accordance with one or more embodiments of the invention is shown.

Figure 6G:
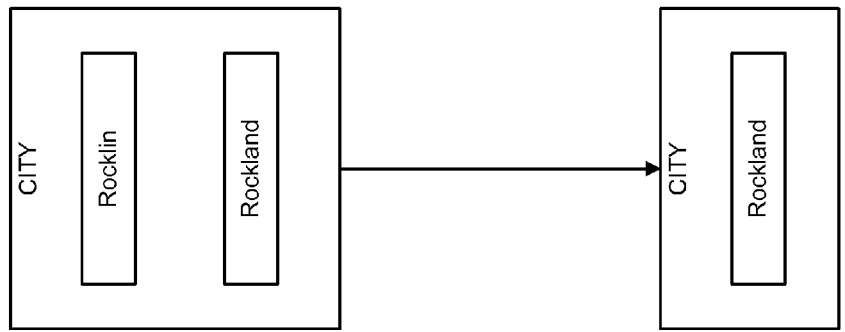
Figure 6G:
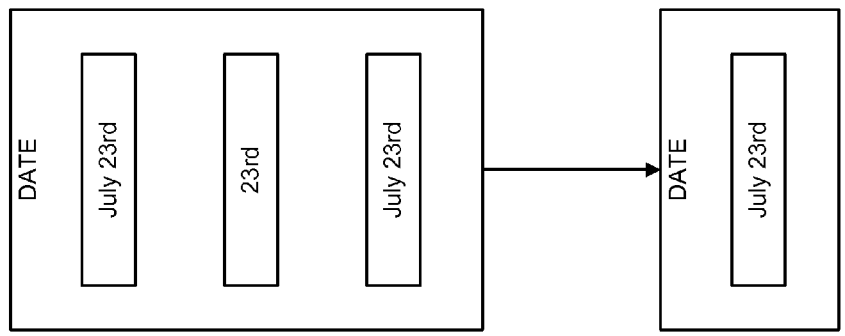
Figure 6G:
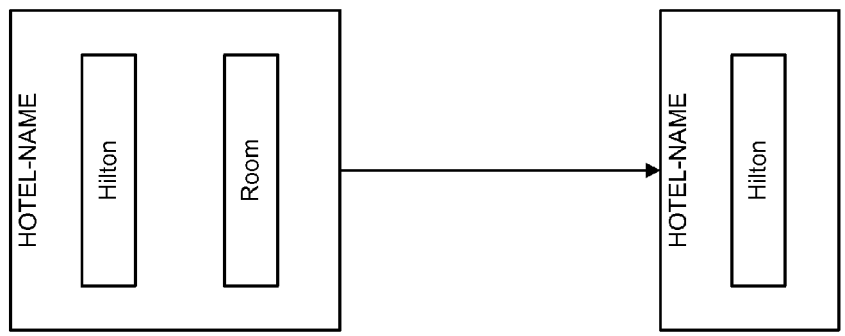

In Step 400, the entities from all transcriptions that correspond to the selected domain are obtained (see e.g., FIG. 6G). In Step 402, an entity tag is selected from the set of entity tags associated with the domain.

In Step 404, a determination is made about whether any entity in any transcription is tagged with the selected entity tag. If an entity is tagged with the selected entity tag, then the process proceeds to Step 406. Otherwise, the process proceeds to Step 412.

In Step 406, a determination is made whether multiple entities are tagged with the selected entity tag. Said another way, a determination is made about whether there are multiple different entities that are tagged by the same entity tag. If the there are multiple entities tagged with the same entity tag, then the process proceeds to Step 408. Otherwise, the process proceeds to Step 410.

In Step 408, one entity is selected from the set of tagged entities. In one embodiment, the entities may be equivalent and any one of the entities may be selected (see e.g. FIG. 6G). Further, when the entities are different, the NLP system may determine the highest probability entity and select it as the entity tagged by the entity tag. For example, the entities across the transcriptions may include Hilton, Hyatt, and Holiday Inn, and all three may be tagged with the entity tag of HOTEL-NAME. The NLP system may then determine the highest probability entity to be associated with the entity tag of HOTEL-NAME is Hilton.

In Step 410, the system selects the only entity associated with the entity tag. In Step 412, a determination is made whether there are remaining entity tags in the domain to analyze. If there are remaining entities, the process proceeds to Step 402. Otherwise, the process proceeds to FIG. 5.

Referring to FIG. 5, a flowchart for obtaining additional entities corresponding to a domain and performing actions of the entities in accordance with one or more embodiments of the invention is shown.

In Step 500, the entities tagged by entity tags associated with the selected domain are obtained (see FIG. 4) where each entity tag is associated with only one entity.

In Step 502, a determination is made whether each entity tag associated with the selected domain has a corresponding entity. If each entity tag has a corresponding entity, then the process proceeds to Step 510. Otherwise, the process proceeds to Step 504.

In Step 504, entity tags that are not associated with any entity are identified. For example, if the entity tags associated with a domain are HOTEL-NAME, CITY, and DATE, and tagged entities include Houston and Hyatt, then the DATE entity tag would be identified as not being associated with an entity.

In Step 506, dialogue to prompt user to provide missing entities is formulated and sent to the user device. In Step 508, the missing entities are then obtained from the user through responsive dialogue. In one or more embodiments, the responsive dialogue may be analyzed using the NLP system.

In Step 510, the NLP system performs actions using the entities tagged by entity tags associated with a domain. For example, the action HOTEL-EBOOKING may use the entities Hyatt, Houston, and July 4, to request an electronic booking at the Hyatt in Houston, Tex. on July 4.

In Step 512, the NLP system returns the results to user device. For example, the system may send the user device a notice of receipt when the HOTEL-EBOOKING action is successfully processed.

FIGS. 6A-6G show an example in accordance with one or more embodiments of the invention. This example is not intended to limit the scope of the invention or the claims.

Consider a scenario in which a travel application on a user mobile device is processing an utterance. The application specifies a universe of three domains: transportation search, hotel search, and flight search; each domain has entity and transcription-level tags as shown on FIG. 6A. The tagged entities may be used to perform an action.

Referring to FIG. 6B, the user may speak into the user device and create an utterance in the form of an audio file. The audio file may be translated to text by one or more third-party services. The file may be translated by multiple speech-to-text engines or a single engine to produce multiple translations of the same utterance. For this example, each transcription represents a translation from the same speech-to-text engine and is associated with a corresponding confidence level as determined by the speech-to-text engine.

Referring to FIG. 6C, each transcription is tagged with entity tags associated with the selected domains. As shown in the figure, the entity tags HOTEL-NAME, DATE, CITY, and CITY-END, are associated with different entities across the three transcriptions.

Referring to FIG. 6D, the tagged entities are used to determine the transcription-level tag for the transcription. In this example, the three transcription-level tags of BOOK-HOTEL, BOOK-CAR, and BOOK-FLIGHT, are from different domains. The probability of the transcription-level tag being associated with a transcription given that the transcription is tagged with certain entity tags is calculated by the NLP system. The system may also use a maximum entropy Markov model to determine the probabilities.

Referring to FIG. 6E, the system determines which transcription-level tag has the highest probability in order to tag the utterance as a whole. The system calculates the marginal probabilities of each transcription-level tag to determine which tag corresponds to the utterance as a whole by multiplying the confidence level of each transcription with the probability that a given transcription-level tag is associated with the transcription. For this example, the BOOK-HOTEL transcription-level tag has the highest marginal probability out of all three transcription-level tags across all three transcriptions and is selected as the transcription-level tag for the entire utterance.

Referring to FIG. 6F, the domain of hotel search is identified because the entity tag BOOK-HOTEL is associated with that domain. Based on the identified domain, the transcriptions are retagged with the entities in the hotel search domain. Specifically, the transcriptions are retagged with the entity tags of HOTEL-NAME, DATE, CITY, and NUM-NIGHTS. The entity tags HOTEL-NAME, DATE, and CITY, are associated with entities while NUM-NIGHTS is not.

Referring to FIG. 6G, the tagged entities corresponding to the hotel search domain are obtained. One-by-one, each entity tag in the domain that is associated with the transcription-level tag is analyzed.

For this example, the entity tags HOTEL-NAME, DATE, and CITY, are the only tags associated with at least one entity across all three transcriptions. There are multiple entities associated with each entity tag. To resolve the multiple entities tagged by the same entity tag, the NLP system may select an entity based on the entity with the highest probability to be associated with the entity tag. In this case, because none of the entities for a given entity tag are equivalent, the system selects an entity with the highest likelihood of being associated with the entity tag. The resolution of the entities results in the entity tag HOTEL-NAME being associated with "Hilton," the entity tag DATE being associated with "July 23$^{rd}$," and the entity tag CITY being associated with "Rocklin."

The entity tag NUM-NIGHTS, however, is not associated with any entity across the three transcriptions. In this case, the system may generate dialogue such as "How many nights do you plan to stay at the Hilton?" and send it back to the user device. After the user device sends a response such as "Three nights" and all the entity tags are associated with an entity, the system has all the entities necessary to perform a command corresponding to the transcription-level tag of BOOK-HOTEL. The NLP system may use the entities and entity tags to perform the action of booking the reservation with the Hilton hotel in Rocklin on July 23$^{rd}$ for 3 nights.

Software instructions to perform embodiments of the invention may be stored on a non-transitory computer readable medium such as a magnetic storage, optical storage, solid state storage, or any other computer readable storage device. Further, such instructions may be executed by a processor(s) as described above.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising instructions, which when executed perform a method for processing transcriptions using natural language processing (NLP), the method comprising:
    obtaining a plurality of transcriptions corresponding to an utterance, wherein each of the transcriptions is a different speech-to-text conversion of the utterance, wherein the plurality of transcriptions comprises a first transcription and a second transcription, and wherein the utterance was obtained by a user device;
    tagging the first transcription with at least one entity tag to obtain a first tagged transcription;
    tagging the first transcription with a first transcription-level tag using the at least one entity tag associated with the first tagged transcription;
    tagging the second transcription with at least one entity tag to obtain a second tagged transcription;
    tagging the second transcription with a second transcription-level tag using the at least one entity tag associated with the second tagged transcription;
    determining a highest probability transcription-level tag, wherein the highest probability transcription-level tag is one selected from a group consisting of the first transcription-level tag and the second transcription-level tag;
    identifying a subject-matter domain using the highest probability transcription-level tag;
    retagging the first transcription and the second transcription using entity tags associated with the subject-matter domain to obtain a retagged first transcription and a retagged second transcription;
    performing, using the retagged first transcription and the retagged second transcription, an action to obtain result; and
    sending the result to the user device.

2. The non-transitory computer readable medium of claim 1, wherein performing the action comprising:
    identifying tagged entities in the retagged first transcription, wherein the tagged entities are used to perform action.

3. The non-transitory computer readable medium of claim 1, wherein performing the action comprising:
    identifying a first tagged entity in the retagged first transcription,
    identifying a second tagged entity in the retagged second transcription,
    wherein the first tagged entity and the second tagged entity are used to perform the action.

4. The non-transitory computer readable medium of claim 1, wherein performing the action comprising:
    identifying an entity tag in the subject-matter domain that is not associated with any entity in the first transcription and the second transcription;
    generating a dialogue to obtain an entity for the entity tag;
    sending the dialogue to the user device;
    obtaining the entity from the user device in response to the dialogue, wherein the action is performed using the entity.

5. The non-transitory computer readable medium of claim 1, wherein the first transcription-level tag is different than the second transcription-level tag and wherein the highest probability transcription-level tag is the first transcription-level tag.

6. The non-transitory computer readable medium of claim 5, wherein the second transcription-level tag is associated with a second subject-matter domain, wherein the second subject-matter domain is different than the first subject-matter domain.

7. The non-transitory computer readable medium of claim 6, wherein the subject matter domain is associated with a first set of entity tags and the second subject-matter domain is associated with a second set of entity tags.

8. The non-transitory computer readable medium of claim 7, wherein the first tagged transcription comprises using at least the first set of entity tags and the second set of entity tags.

9. The non-transitory computer readable medium of claim 7, wherein at least one of the entity tags in first set of entity tags is not present in second set of entity tags.

10. The non-transitory computer readable medium of claim 1, wherein tagging the first transcription with the first transcription-level tag comprises using NLP.

11. The non-transitory computer readable medium of claim 10, wherein NLP comprises using a maximum entropy Markov model.

12. The non-transitory computer readable medium of claim 1, wherein determining a highest probability transcription-level tag comprises selecting one from a group consisting of the first transcription-level tag and the second transcription-level tag that has a highest marginal probability.

13. The non-transitory computer readable medium of claim 12, wherein the highest marginal probability for each of the transcription is determined using at least a confidence level associated with the transcription and a probability of a transcription-level tag being associated with the transcription.

14. A Natural Language Processing (NLP) system, comprising:
  a processor;
  a memory comprising instructions, which when executed by a processor perform a method, the method comprising:
    obtaining a plurality of transcriptions corresponding to an utterance, wherein each of the transcriptions is a different speech-to-text conversion of the utterance, wherein the plurality of transcriptions comprises a first transcription and a second transcription, and wherein the utterance was obtained by a user device;
    tagging the first transcription with at least one entity tag to obtain a first tagged transcription;
    tagging the first transcription with a first transcription-level tag using the at least one entity tag associated with the first tagged transcription;
    tagging the second transcription with at least one entity tag to obtain a second tagged transcription;
    tagging the second transcription with a second transcription-level tag using the at least one entity tag associated with the second tagged transcription;
    determining a highest probability transcription-level tag, wherein the highest probability transcription-level tag is one selected from a group consisting of the first transcription-level tag and the second transcription-level tag;
    identifying a subject-matter domain using the highest probability transcription-level tag;
    retagging the first transcription and the second transcription using entity tags associated with the subject-matter domain to obtain a retagged first transcription and a retagged second transcription;
    performing, using the retagged first transcription and the retagged second transcription, an action to obtain result; and
    sending the result to the user device.

15. The system of claim 14, wherein the user device is a mobile device.

16. The system of claim 14, wherein the user device comprising an application that is configured to send the utterance to the NLP system.

17. The system of claim 14, the method further comprising:
  receiving the utterance;
  providing the utterance to a third-party speech-to-text service; and
  receiving the plurality of transcriptions from the third-party speech-to-text service.

18. A method for processing transcriptions using natural language processing (NLP), comprising:
  obtaining a plurality of transcriptions corresponding to an utterance, wherein each of the transcriptions is a different speech-to-text conversion of the utterance, wherein the plurality of transcriptions comprises a first transcription and a second transcription, and wherein the utterance was obtained by a user device;
  tagging the first transcription with at least one entity tag to obtain a first tagged transcription;
  tagging the first transcription with a first transcription-level tag using the at least one entity tag associated with the first tagged transcription;
  tagging the second transcription with at least one entity tag to obtain a second tagged transcription;
  tagging the second transcription with a second transcription-level tag using the at least one entity tag associated with the second tagged transcription;
  determining, by a processor, a highest probability transcription-level tag, wherein the highest probability transcription-level tag is one selected from a group consisting of the first transcription-level tag and the second transcription-level tag;
  identifying a subject-matter domain using the highest probability transcription-level tag;
  retagging the first transcription and the second transcription using entity tags associated with the subject-matter domain to obtain a retagged first transcription and a retagged second transcription;
  performing, using the retagged first transcription and the retagged second transcription, an action to obtain result; and
  sending the result to the user device.

19. The method of claim 18, wherein performing the action comprising:
  identifying a first tagged entity in the retagged first transcription,
  identifying a second tagged entity in the retagged second transcription,
  wherein the first tagged entity and the second tagged entity are used to perform the action.

20. The method of claim 18, wherein performing the action comprising:
  identifying an entity tag in the subject-matter domain that is not associated with any entity in the first transcription and the second transcription;
  generating a dialogue to obtain an entity for the entity tag;
  sending the dialogue to the user device;
  obtaining the entity from the user device in response to the dialogue, wherein the action is performed using the entity.

* * * * *